United States Patent
Desclos et al.

(10) Patent No.: US 9,654,230 B2
(45) Date of Patent: *May 16, 2017

(54) MODAL ADAPTIVE ANTENNA FOR MOBILE APPLICATIONS

(71) Applicant: Ethertronics, Inc., San Diego, CA (US)

(72) Inventors: Laurent Desclos, San Diego, CA (US); Sebastian Rowson, San Diego, CA (US); Jeffrey Shamblin, San Marcos, CA (US)

(73) Assignee: ETHERTRONICS, INC., San Diego, CA (US)

( * ) Notice: Subject to any disclaimer, the term of this patent is extended or adjusted under 35 U.S.C. 154(b) by 621 days.

This patent is subject to a terminal disclaimer.

(21) Appl. No.: 14/040,531

(22) Filed: Sep. 27, 2013

(65) Prior Publication Data

US 2014/0099982 A1     Apr. 10, 2014

Related U.S. Application Data

(63) Continuation-in-part of application No. 13/118,374, filed on May 28, 2011, now abandoned, and a continuation-in-part of application No. 13/289,901, filed on Nov. 4, 2011, now Pat. No. 8,717,241, which is a continuation of application No. 12/894,052, filed on Sep. 29, 2010, now Pat. No. 8,077,116, which is a continuation of application No. 11/841,207, filed on Aug. 20, 2007, now Pat. No. 7,830,320, application No. 14/040,531, filed on Sep. 27, 2013, which is a continuation-in-part of application No. 13/674,078, filed on Nov. 11, 2012, now Pat. No. 8,928,540, and (Continued)

(51) Int. Cl.
| | |
|---|---|
| *H01Q 9/04* | (2006.01) |
| *H04B 15/00* | (2006.01) |
| *H04B 17/00* | (2015.01) |
| *H04B 17/318* | (2015.01) |
| *H04B 17/345* | (2015.01) |
| *H04B 1/3827* | (2015.01) |

(52) U.S. Cl.
CPC ............ *H04B 15/00* (2013.01); *H04B 17/00* (2013.01); *H04B 17/318* (2015.01); *H04B 17/345* (2015.01); *H04B 1/3838* (2013.01)

(58) Field of Classification Search
CPC ........ H01Q 1/243; H01Q 5/371; H01Q 5/385; H01Q 5/392; H01Q 9/0442; H01Q 9/145; H01Q 9/42
USPC ................... 343/700 MS, 745, 795, 815, 834
See application file for complete search history.

(56) References Cited

U.S. PATENT DOCUMENTS

| | | | | |
|---|---|---|---|---|
| 4,591,863 A | * | 5/1986 | Patsiokas | ............... H01Q 1/243 343/702 |
| 6,061,025 A | * | 5/2000 | Jackson | ................... H01Q 1/38 343/700 MS |

(Continued)

*Primary Examiner* — Tho G Phan
(74) *Attorney, Agent, or Firm* — Coastal Patent Law Group, P.C.

(57) ABSTRACT

An adaptive antenna system for mobile applications where the mode of the antenna is optimized dynamically to optimize link quality with intended sources. Interfering signals are suppressed by mode selection to minimize link quality by altering antenna radiation pattern characteristics. A single driven antenna is configured such that the radiating mode can be dynamically adjusted and optimized based on link metrics.

10 Claims, 18 Drawing Sheets

Related U.S. Application Data a continuation-in-part of application No. 13/726,477, filed on Dec. 24, 2012, now Pat. No. 8,648,755, which is a continuation of application No. 13/029,564, filed on Feb. 17, 2011, now Pat. No. 8,362,962, which is a continuation of application No. 12/043,090, filed on Mar. 5, 2008, now Pat. No. 7,911,402.

(56) References Cited

U.S. PATENT DOCUMENTS

| | | | | |
|---|---|---|---|---|
| 6,765,536 B2 * | 7/2004 | Phillips | ............... | H01Q 1/362 343/702 |
| 6,980,173 B2 * | 12/2005 | Man | ............... | H01Q 1/243 343/700 MS |
| 7,180,464 B2 * | 2/2007 | Chiang | ............... | H01Q 1/242 343/702 |
| 7,345,634 B2 * | 3/2008 | Ozkar | ............... | H01Q 1/38 343/700 MS |
| 7,990,320 B2 * | 8/2011 | Pros | ............... | H01Q 5/371 343/700 MS |
| 9,123,986 B2 * | 9/2015 | Shamblin | ............... | H01Q 9/06 |

* cited by examiner

MODAL ADAPTIVE ANTENNA FOR MOBILE APPLICATIONS

CROSS-REFERENCE TO RELATED APPLICATIONS

This application is a CIP of U.S. Ser. No. 13/118,374, filed May 28, 2011, titled "MODAL ADAPTIVE ANTENNA FOR MOBILE APPLICATIONS";

a CIP of U.S. Ser. No. 13/726,477, filed Dec. 24, 2012, and titled "ANTENNA AND METHOD FOR STEERING ANTENNA BEAM DIRECTION"; which is a CON of U.S. Ser. No. 13/029,564, filed Feb. 17, 2011, and titled "ANTENNA AND METHOD FOR STEERING ANTENNA BEAM DIRECTION", now issued as U.S. Pat. No. 8,362,962; which is a CON of U.S. Ser. No. 12/043,090, filed Mar. 5, 2008, titled "ANTENNA AND METHOD FOR STEERING ANTENNA BEAM DIRECTION", now issued as U.S. Pat. No. 7,911,402;

a CIP of U.S. Ser. No. 13/289,901, filed Nov. 4, 2011, titled "ANTENNA WITH ACTIVE TUNING ELEMENTS", which is a CON of U.S. Ser. No. 12/894,052, filed Sep. 29, 2010, titled "ANTENNA WITH ACTIVE TUNING ELEMENTS", now U.S. Pat. 8,077,116, which is a CON of Ser. No. 11/841,207, filed Aug. 20, 2007, titled "ANTENNA WITH ACTIVE TUNING ELEMENTS", now U.S. Pat. No. 7,830,320; and a CIP of U.S. Ser. No. 13/674,078, filed Nov. 11, 2012, titled "MULTI-ANTENNA MODULE CONTAINING ACTIVE TUNING ELEMENTS AND CONTROL CIRCUITS FOR WIRELESS SYSTEMS";

the contents of each of which are hereby incorporated by reference.

BACKGROUND OF THE INVENTION

Field of the Invention

The present invention relates to the field of wireless communication; more particularly, the present invention relates to a wireless communication device that uses adaptive beam steering for communication link optimization.

Related Art

As new generations of handsets and other wireless communication devices become smaller and embedded with increased applications, new antenna designs are required to address inherent limitations of these devices and to enable new capabilities. With classical antenna structures, a certain physical volume is required to produce a resonant antenna structure at a particular frequency and with a particular bandwidth. In multi-band applications, more than one such resonant antenna structure may be required. But effective implementation of such complex antenna arrays may be prohibitive due to size constraints associated with mobile devices.

SUMMARY OF THE INVENTION

A method has been derived for increasing link budget based on the management of the losses in the near field associated with an antenna system. Additionally, an antenna system is disclosed which is adapted to modify the link budget in such a way that the loss in the near field will be less than the loss when using a single tuned antenna.

BRIEF DESCRIPTION OF THE DRAWINGS

These and other attributes of the invention are further described in the following detailed description, particularly when reviewed in conjunction with the drawings, wherein.

DETAILED DESCRIPTION OF THE PREFERRED EMBODIMENTS

Figure 1:
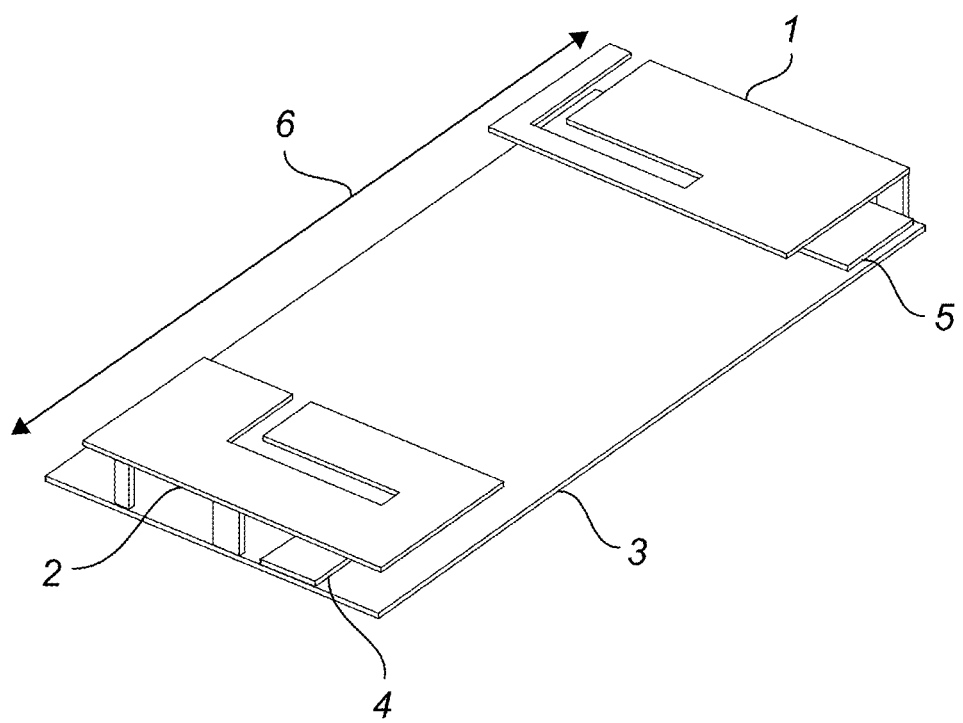
FIG. 1 illustrates an antenna system having two antennas positioned on a ground plane to form a two-element array.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

Commonly owned, U.S. Pat. No. 7,911,402, titled "ANTENNA AND METHOD FOR STEERING ANTENNA BEAM DIRECTION", and U.S. Pat. No. 7,830,320, titled "ANTENNA WITH ACTIVE TUNING ELEMENTS", disclose antenna systems capable of beam steering, band switching, active matching, and other active tunable characteristics; the contents of each of which are hereby incorporated by reference. These antennas utilize a radiating element and one or more parasitic elements coupled to active tuning elements in a manner for enabling switching, variable reactance, and other tuning of the antenna components. The resulting structure is an active tunable antenna capable of operating in multiple modes, otherwise termed an "active modal antenna" or "modal antenna". The referenced patents disclose active modal antennas and thus details of these structures will not be discussed in detail herein.

An "active modal antenna" as referred to herein includes an antenna capable of selective operation about a plurality of modes, wherein each of said plurality of modes generates a distinct antenna radiation pattern resulting from the first active modal antenna. In this regard, the active modal antenna can be reconfigured as necessary to provide an optimal radiation pattern. This is accomplished by one or more of: band-switching, beam steering, and active impedance matching as environmental effects detune the antenna. In representative examples, an active modal antenna comprises a radiating structure disposed above a circuit board and forming an antenna volume therebetween; a parasitic element positioned adjacent to the radiating structure; and an active tuning element coupled to the parasitic element; wherein the active tuning element is configured for one or more of: adjusting a reactance of the parasitic element, or shorting the parasitic element to ground.

As referenced herein, an "active tuning element" may comprise at least one of: a voltage controlled tunable capacitor, voltage controlled tunable phase shifter, field-effect transistor (FET), tunable inductor, switch, or any combination thereof.

An "adaptive antenna" is described herein as a modal antenna system configured to sample one or more input parameters to select an optimum mode and adapt the radiation pattern to maximize performance over one or more sampled metrics.

In one aspect of the invention, a modal adaptive antenna comprises an isolated magnetic dipole (IMD) element, a first parasitic element and a first active tuning element associated with said parasitic element, and an antenna tuning module (ATM) which provides control signals to the active tuning element or components to alter the radiating mode of the IMD element. The ATM contains a processor to monitor communication system performance to determine when the antenna mode is to be altered. The receive signal strength indicator (RSSI) or other system metric is sampled from the signal source of interest and the first interferer and the antenna mode is altered to reduce the signal level of the interferer.

In another embodiment, the algorithm and software used to control the modal adaptive antenna reside in the antenna tuning module (ATM). In another embodiment, the algorithm and software reside in the baseband processor or other processor associated with the communication or wireless device that the modal adaptive antenna is integrated in.

In another embodiment, the active tuning element is adapted to provide a split resonant frequency characteristic associated with the antenna. The tuning element may be adapted to rotate the radiation pattern associated with the antenna. This rotation may be effected by controlling the current flow through the parasitic element. In one embodiment, the parasitic element is positioned on a substrate. This configuration may become particularly important in applications where space is the critical constraint.

In another embodiment, the parasitic element is positioned at a pre-determined angle with respect to the IMD element. For example, the parasitic element may be positioned parallel to the IMD, or it may be positioned perpendicular to the IMD. The parasitic element may further comprise multiple parasitic sections.

In another embodiment, the active tuning elements comprise at least one of the following: voltage controlled tunable capacitors, voltage controlled tunable phase shifters, FET's, and switches.

In another embodiment, the modal adaptive antenna further comprises one or more additional parasitic elements, and one or more active tuning elements associated with those additional parasitic elements. The additional parasitic elements may be located to one side of said IMD element. They may further be positioned at predetermined angles with respect to the first parasitic element. The ATM provides the control signals required for all parasitic comprising the modal adaptive antenna. Additional nulls in the radiation pattern can be formed to provide additional rejection from multiple interferers. The RSSI or other system metric is sampled from the signal source of interest and the multiple interferers and the antenna mode is altered to reduce the signal level of said interferers.

In another embodiment of the present invention, the antenna further includes a third active tuning element associated with the IMD element. This third active tuning element is adapted to tune the frequency characteristics associated with the antenna. This third active tuning element is also controlled by the ATM and is adjusted in unison with the parasitic or parasitic to optimize the modal adaptive antenna performance.

Another aspect of the invention relates to a method for forming a modal adaptive antenna with beam steering capabilities. The method comprises providing an IMD element, and positioning one or more beam steering parasitic elements, coupled with one or more active tuning elements, to one side of the IMD element, with control signals provided by an ATM or a processor located in the baseband or other section of the wireless device. In another embodiment, a method for forming a modal adaptive antenna with combined beam steering and frequency tuning capabilities is disclosed. The method comprises providing an IMD element, and positioning one or more beam steering parasitic elements, coupled with one or more active tuning elements, to one side of the IMD element. The method further comprises positioning one or more frequency tuning parasitic elements, coupled with one of more active tuning elements, below the IMD. An algorithm residing in the processor of the ATM or a processor located in the wireless device provide control signals for all active tuning elements to adjust the antenna radiation pattern characteristics.

Those skilled in the art will appreciate that various embodiments discussed above, or parts thereof, may be combined in a variety of ways to create further embodiments that are encompassed by the present invention.

Now turning to the figures, FIG. 1 illustrates two antennas 1 and 2 connected to a circuit board 3 using a classical technology like a PIFA (planar inverted F antenna) or any counterpoised resonating antenna. The spacing 6 between antennas 1 and 2 is critical to the array design. Parasitic elements 4 and 5 are used to control amplitude and phasing.

Figure 2:
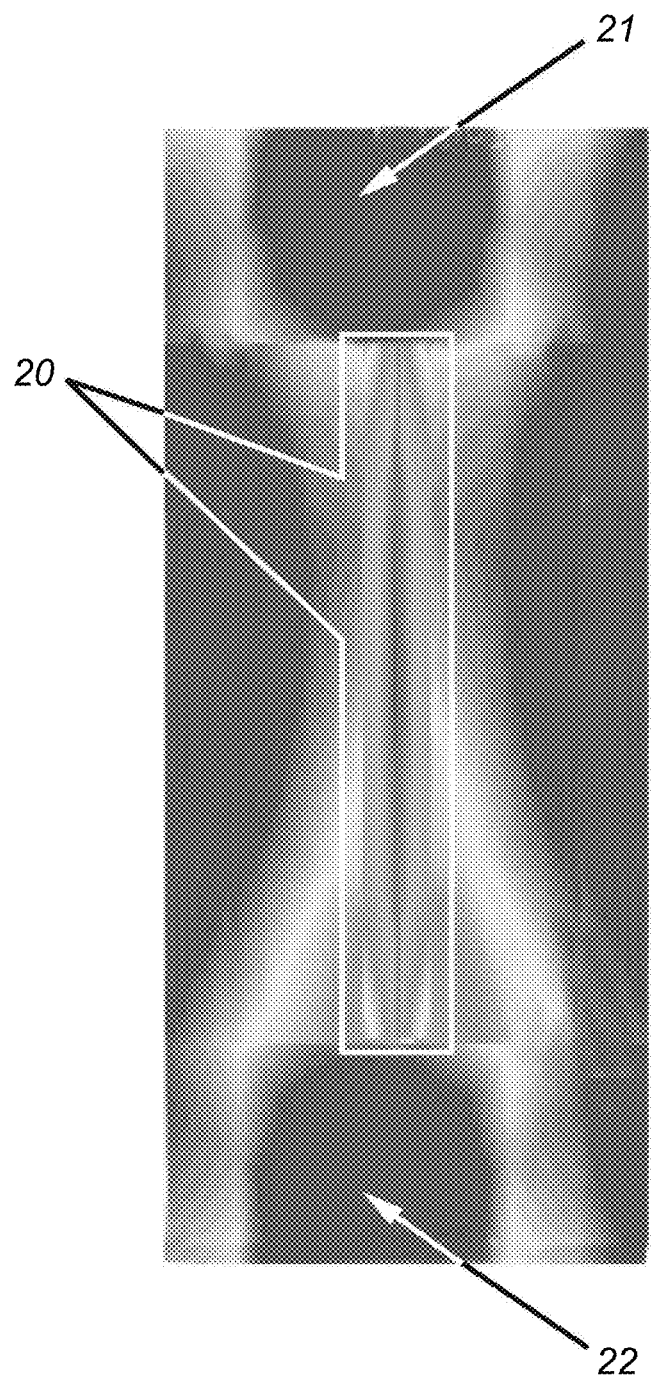
FIG. 2 illustrates a plot of the current flow between two antennas; high current density on the ground plane couples the two antennas, reducing overall antenna performance.

FIG. 2 illustrates a plot of current flow 20 between two antennas 21 and 22 that could result from a circuit configuration as shown in FIG. 1.

Figure 3A:
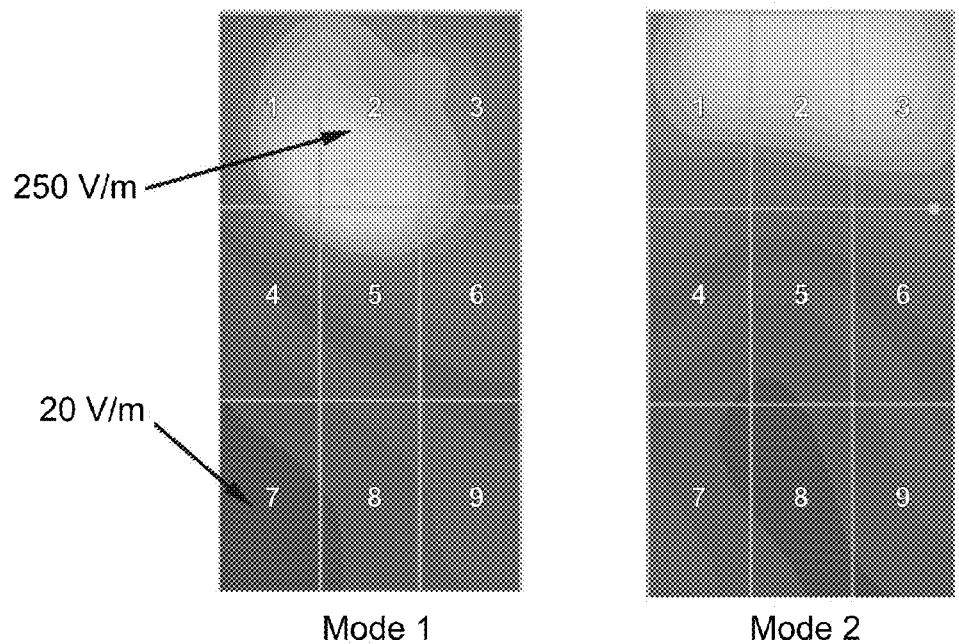
FIG. 3A illustrates a radiation pattern of the near field for the E field in accordance with each of two different antenna modes identified as modes 1 and 2.
Figure 3B:
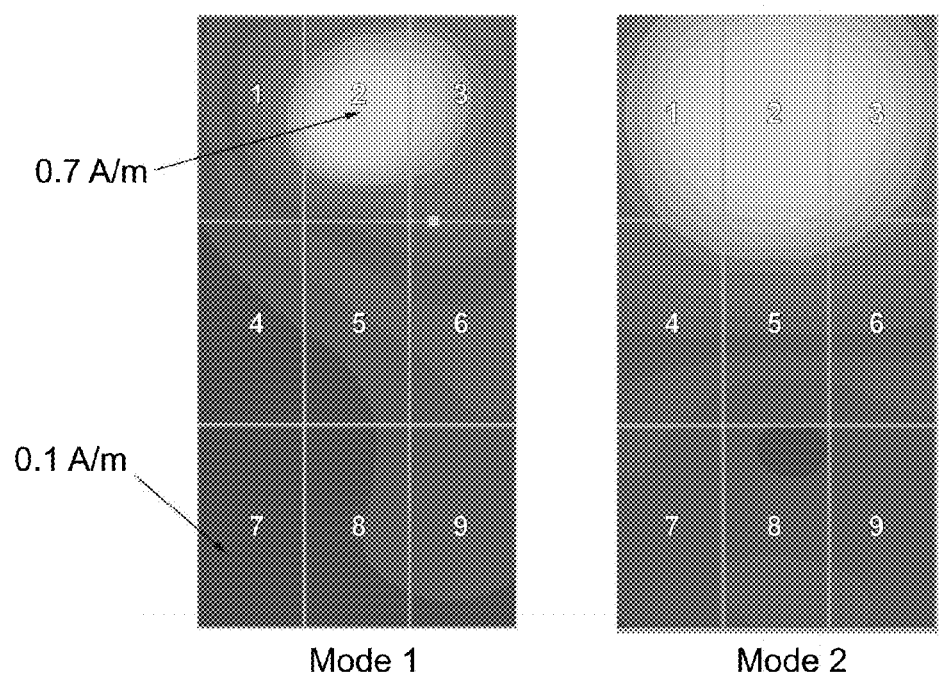
FIG. 3B illustrates radiation pattern of the near field for the H field in accordance with each of the two different antenna modes identified as modes 1 and 2.
Figure 4A:
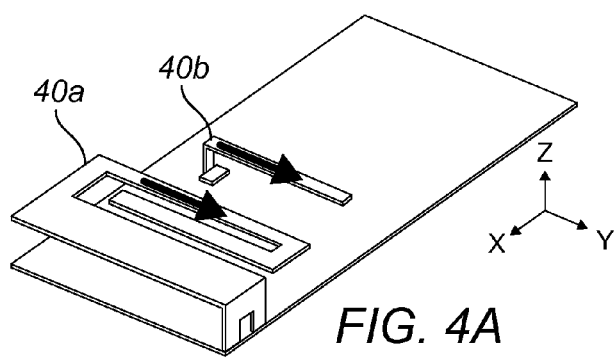
FIG. 4A shows a beam steering antenna in accordance with a first antenna mode.
Figure 4B:
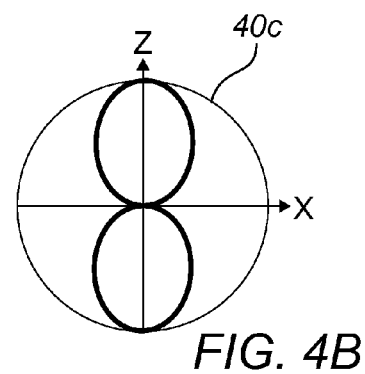
FIG. 4B illustrates the phase of the antenna of FIG. 4A in the first antenna mode.
Figure 4C:
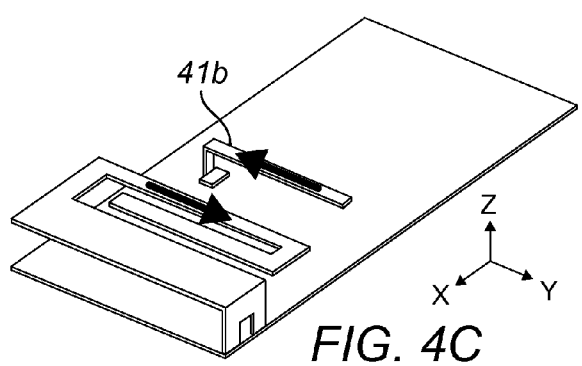
FIG. 4C shows a beam steering antenna in accordance with a second antenna mode.
Figure 4D:
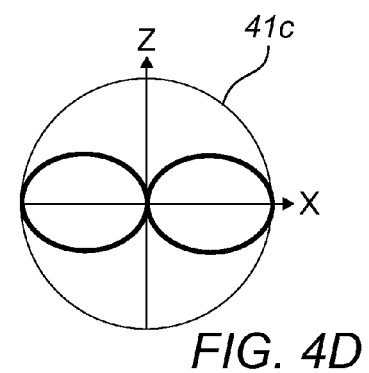
FIG. 4D illustrates the phase of the antenna of FIG. 4C in the second antenna mode.
Figure 4E:
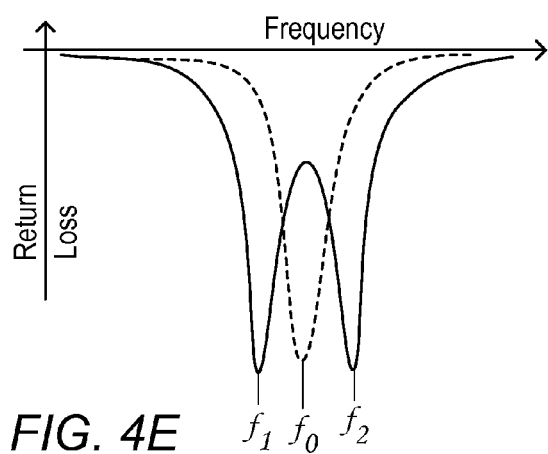
FIG. 4E shows the resultant frequency response of the antenna of FIGS. 4A and 4C in each of the first and second modes.
Figure 4F:
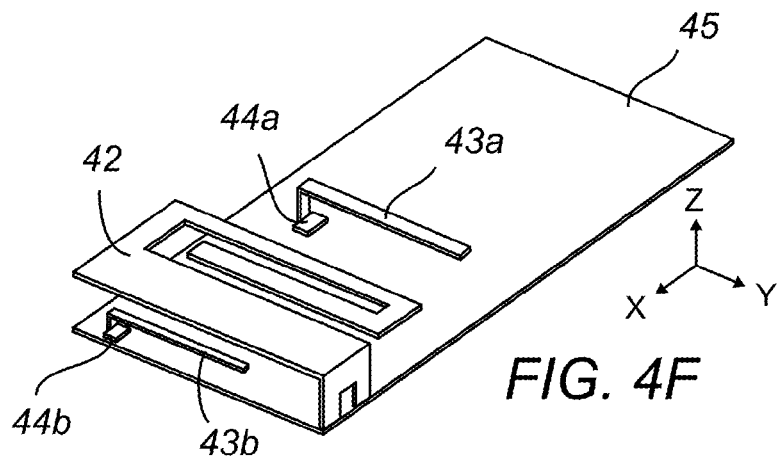
FIG. 4F shows a beam steering and band switching active modal antenna capable of the functions of the antenna of FIGS. 4(A-E) and further capable of shifting the rotated pattern such that the resultant frequency returns to that of the first mode but with a distinct phase relationship.
Figure 4G:
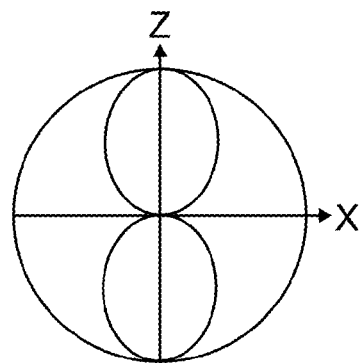
FIG. 4G illustrates the phase of the antenna of FIG. 4F in the first antenna mode.
Figure 4H:
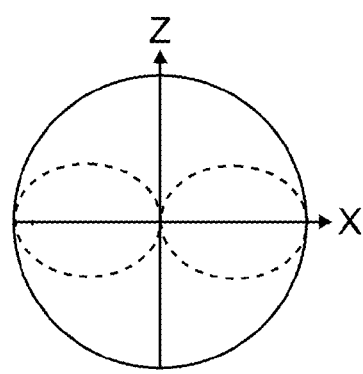
FIG. 4H illustrates the phase of the antenna of FIG. 4F in the second antenna mode.
Figure 4I:
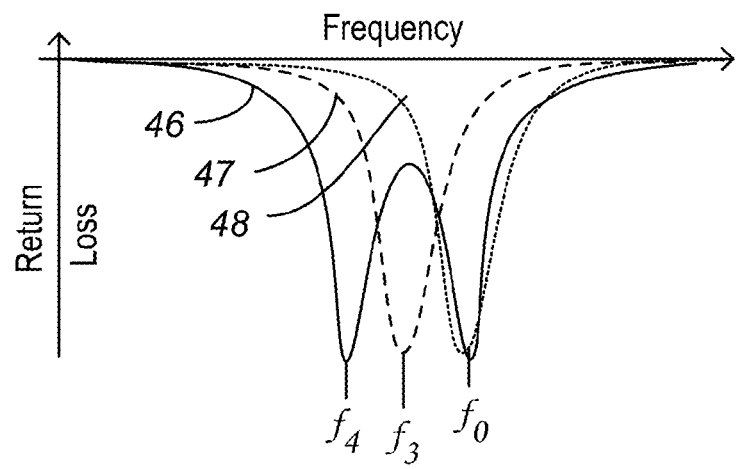
FIG. 4I shows the resultant frequency response of the antenna of FIGS. 4F in each of the first and second modes.

FIG. 3 illustrates corresponding plots of the overall radiation pattern that result from different activations and tuning of the antenna through voltage control. FIG. 3A shows the plot of a radiation pattern of the near field for the E field in accordance with each of two different modes identified as mode 1 and mode 2, respectively. FIG. 3B shows the plot of a radiation pattern of the near field for the H field in accordance with each of two different modes identified as mode 1 and mode 2, respectively.

FIGS. 4(A-E) illustrate an example of an active beam steering antenna, wherein an active tuning element is coupled to a parasitic element and positioned adjacent to an antenna radiating element, the active tuning element is adjusted to combine with the antenna radiating element to provide an altered radiation pattern compared to the driven antenna by itself. The frequency of operation of the driven antenna varies as a function of reactive loading of the parasitic. As shown in FIG. 4A, the active antenna comprises an antenna radiating element 40a disposed above a circuit board and a parasitic element 40b disposed adjacent to the antenna radiating element. A three dimensional axis is shown for comparison to a phase illustration in FIG. 4B. The parasitic element is coupled to an active tuning element. In a first mode of the active antenna, a single resonance $f_0$ is created when the parasitic element 40b is NOT shorted to ground. FIG. 4B shows the phase 40c of the active antenna of FIG. 4a in accordance with the first mode, note the z-axis direction aligns with the phase of the antenna. FIG. 4C illustrates the antenna of FIG. 4A in accordance with a second mode, wherein dual resonances $f_1$ and $f_2$ are created when the parasitic element 41b is shorted to ground. FIG. 4D shows the resulting phase 41c of the antenna in the second mode. FIG. 4E shows the corresponding frequency characteristics of the antenna in each of the first mode at frequency $f_0$ (shown in dashed lines), and the second mode (split resonances $f_1$ and $f_2$). The parasitic and other elements can be tuned either by varactor diodes or variable elements that are voltage driven. In this example, an active modal antenna is provided that is capable of shifting phase from a first direction to a second direction (an associated maxima or nulls of the resulting radiation pattern) and varying the frequency response of the antenna.

FIGS. 4(F-I) show a beam steering and band shifting active modal antenna configured to generate multiple modes. As illustrated in FIG. 4F, the antenna comprises an antenna radiating element 42 positioned above a circuit board 45 (ground plane) forming an antenna volume therebetween. A first parasitic element 43a is positioned outside of the antenna volume and adjacent to the radiating element. The first parasitic element 43a is coupled to a first active tuning element 44a. A second parasitic element 43b is positioned at least partially within the antenna volume and coupled to a respective active tuning element 44b. The antenna radiating element is configured with a first radiation pattern. The pattern is altered when the first parasitic element is adjusted or shorted to form a second radiation pattern. The pattern is further altered when the second parasitic element is adjusted or shorted to form a third radiation pattern. It has been discovered that the first parasitic element positioned outside of the antenna volume tends to rotate or steer the radiation pattern of the antenna, whereas the second parasitic element positioned within the antenna volume tends to shift the frequency response of the antenna. Thus, the first parasitic element acts as a beam steering parasitic element, and the second parasitic element acts as a band switching parasitic element. The phase of the antenna is shifted from a first phase shown in FIG. 4G to a second phase as shown in FIG. 4H using the first parasitic element. The result is three antenna modes using the radiating element alone (first mode) 48; the radiating element and the first parasitic (second mode) 47; and the radiating element and first and second parasitic elements (third mode) 46 as depicted in FIG. 4I. Note that the antenna in the first mode results in operation at frequency $f_0$; operation at frequency $f_3$ in the second mode; and operation at frequency $f_0$ and $f_4$ in the third mode.

Figure 5:
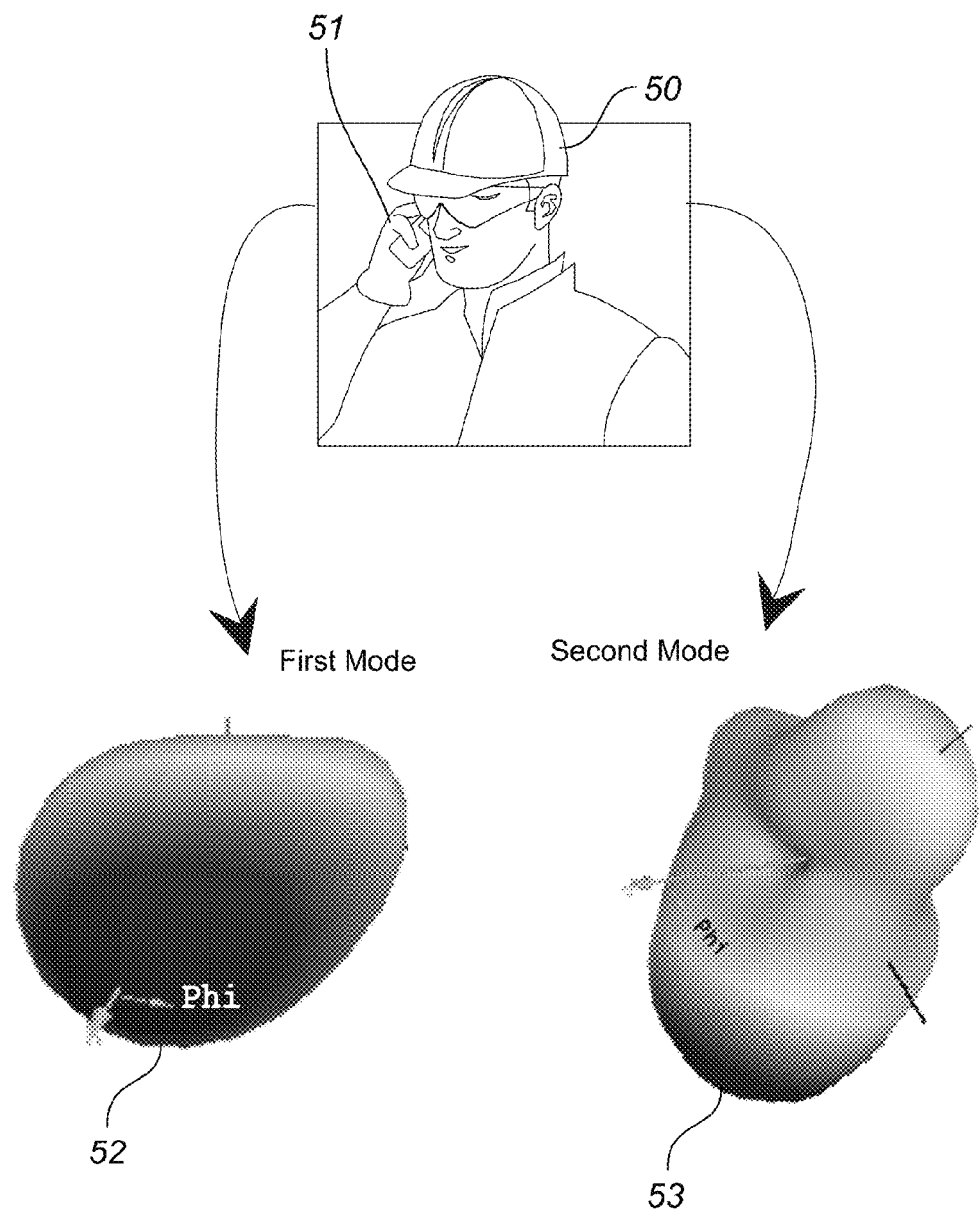
FIG. 5 illustrates a use case where the antenna radiation pattern can be adjusted between two states to optimize when a cell phone is placed against the user's head.

FIG. 5 illustrates a use case where the antenna radiation pattern can be adjusted between two antenna modes to optimize a resultant radiation pattern when a cell phone 51 is placed against the user's head 50. Two antenna radiation pattern modes 52 and 53, respectively, can be sampled to determine which radiation pattern provides optimal link quality.

Figure 6:
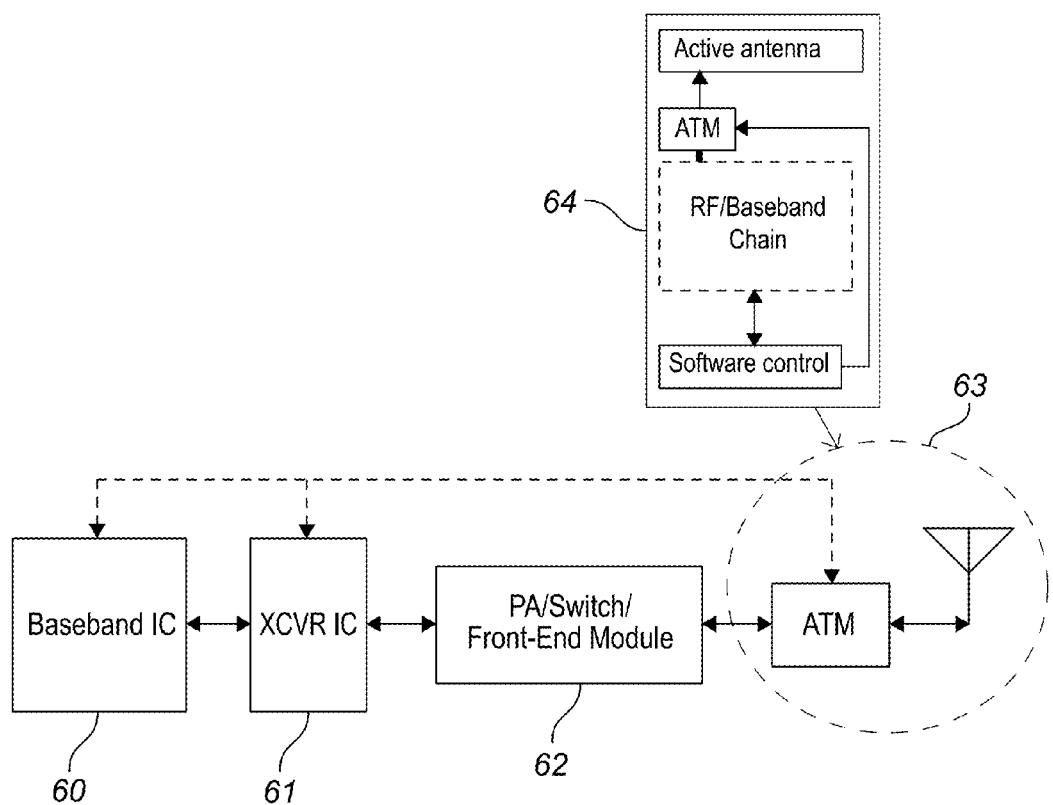
FIG. 6 illustrates an adaptive antenna system capable of adjusting the antenna mode to optimize the antenna radiation pattern using software and processing provided from the host device.

FIG. 6 illustrates an adaptive antenna system capable of adjusting the antenna mode to optimize the antenna radiation pattern. A baseband circuit 60 along with a transceiver 61 and power amplifier (PA)/switch/front end module 62 are connected to an antenna assembly 63 consisting of an antenna element and antenna tuning module (ATM). A circuit schematic 64 of this system illustrates that software control of the antenna functions are provided by the baseband sub-system.

Figure 7:
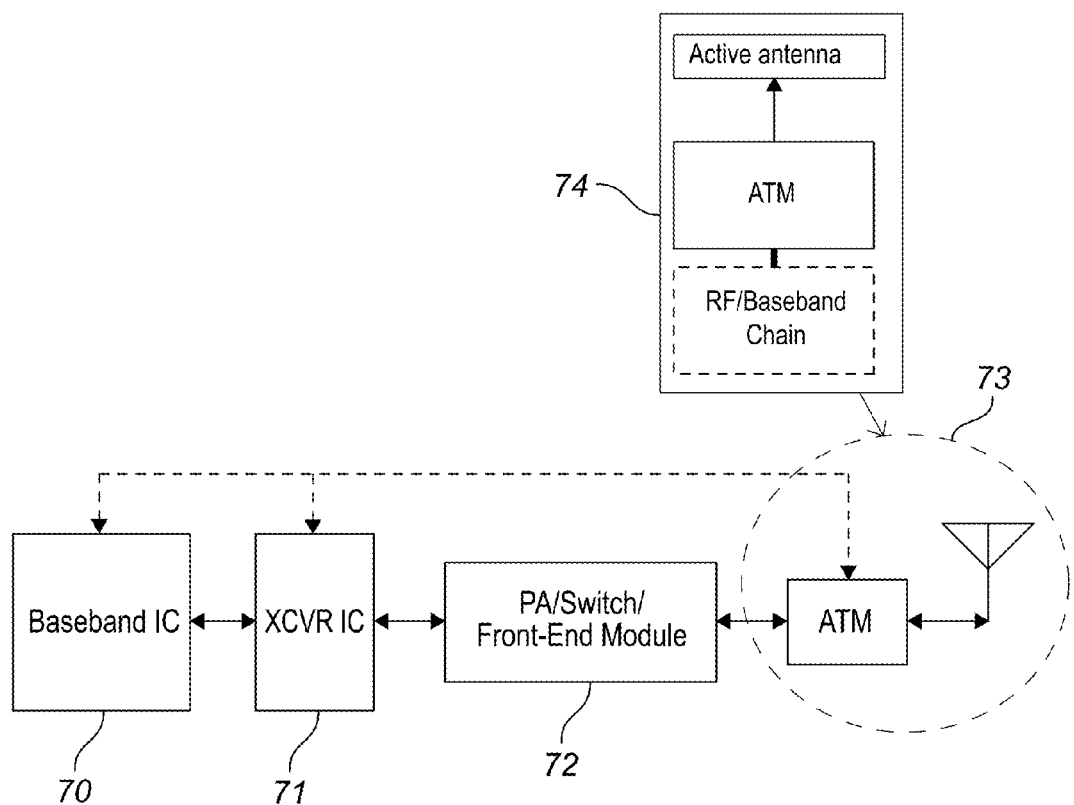
FIG. 7 illustrates an adaptive antenna system capable of adjusting the antenna mode to optimize the antenna radiation pattern using software and processing embedded in the ATM (Antenna Tuning Module).

FIG. 7 illustrates an adaptive antenna system capable of adjusting the antenna mode to optimize the antenna radiation pattern. A baseband circuit 70 along with a transceiver 71 and power amplifier (PA)/switch/front end module 72 are connected to an antenna assembly 73 consisting of an antenna element and antenna tuning module (ATM). A circuit schematic 74 of this system illustrates that software control of the antenna functions are provided by the ATM.

Figure 8:
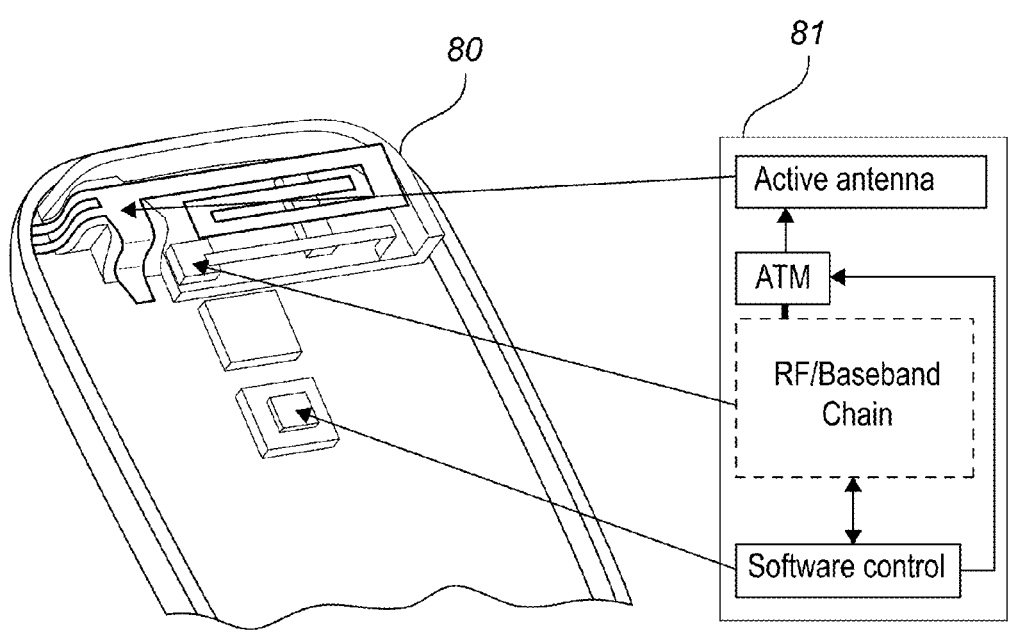
FIG. 8 illustrates the physical placement of components in a cell phone and how they relate to a block diagram of the components.

FIG. 8 illustrates an example of the physical layout of cell phone circuitry 80 and how particular circuitry relates to a block diagram 81 of a closed loop system as described in FIG. 6. The cell phone circuitry includes an active antenna, an antenna tuning module (ATM) coupled to an RF/baseband chain, and software control contained within a memory and processor.

Figure 9:
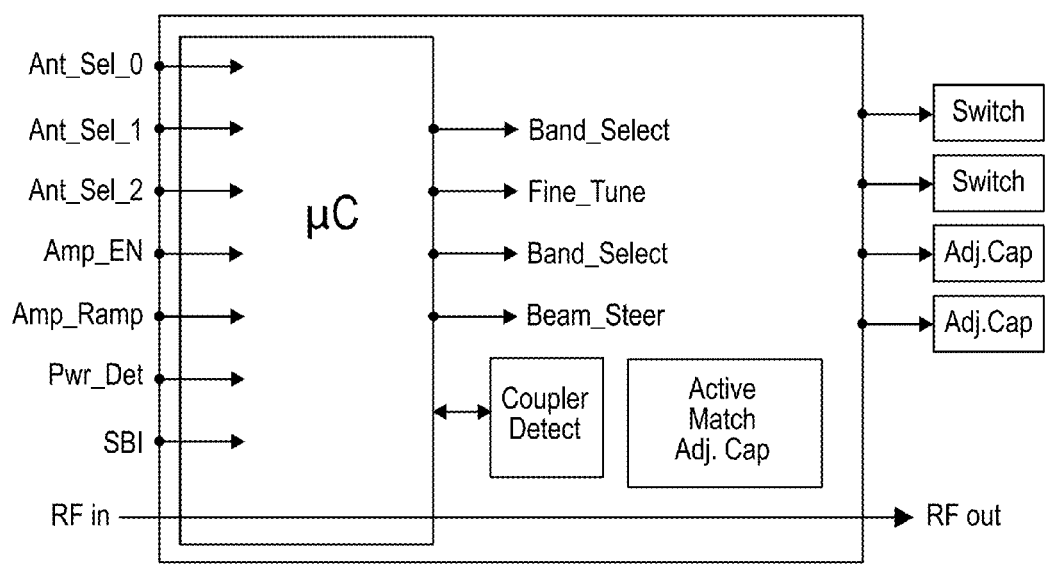
FIG. 9 illustrates an example of an ATM.

FIG. 9 illustrates an example of an antenna tuning module. Multiple inputs, such as antenna select, power ramp, and power detect, are fed into the microprocessor. Outputs of the microprocessor are command signals for band switching, impedance matching, and beam steering. These signals control switches and other active tuning elements to tune and modify antenna performance. RF input and output ports are included in the ATM.

Figure 10A:
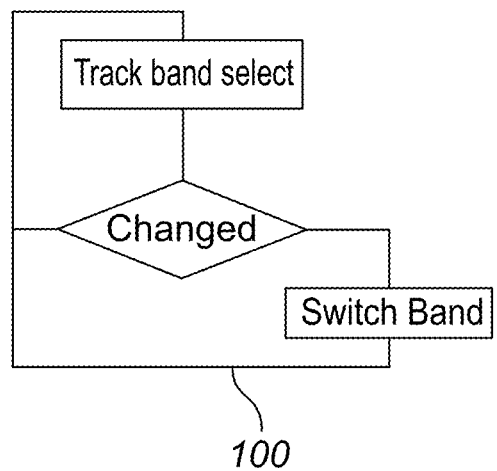
FIG. 10A illustrates a process used to determine when to adjust the band select, beam position, and impedance match of the antenna to adjust the mode of the antenna for optimum link quality in accordance with an embodiment.
Figure 10B:
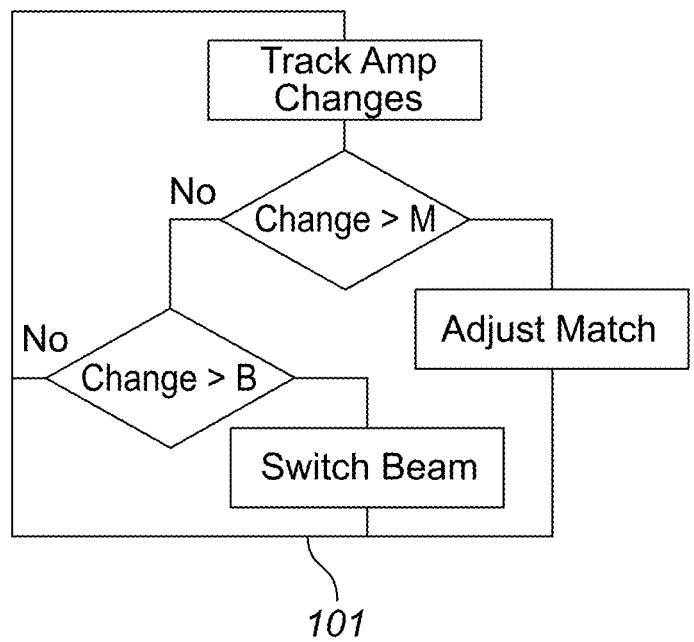
FIG. 10B illustrates a process used to determine when to adjust the band select, beam position, and impedance match of the antenna to adjust the mode of the antenna for optimum link quality accordance with another embodiment.

FIGS. 10(A-B) illustrate two flowcharts for control implementations for an adaptive antenna. In flowchart labeled 100 as shown in FIG. 10A, a simple algorithm is implemented to track frequency band select status and switch the antenna frequency band characteristics of the adaptive antenna. In flowchart labeled 101 as shown in FIG. 10B, a more extensive algorithm is implemented to control frequency band switching, antenna impedance match optimization, and beam steering functions of the adaptive antenna.

Figure 11:
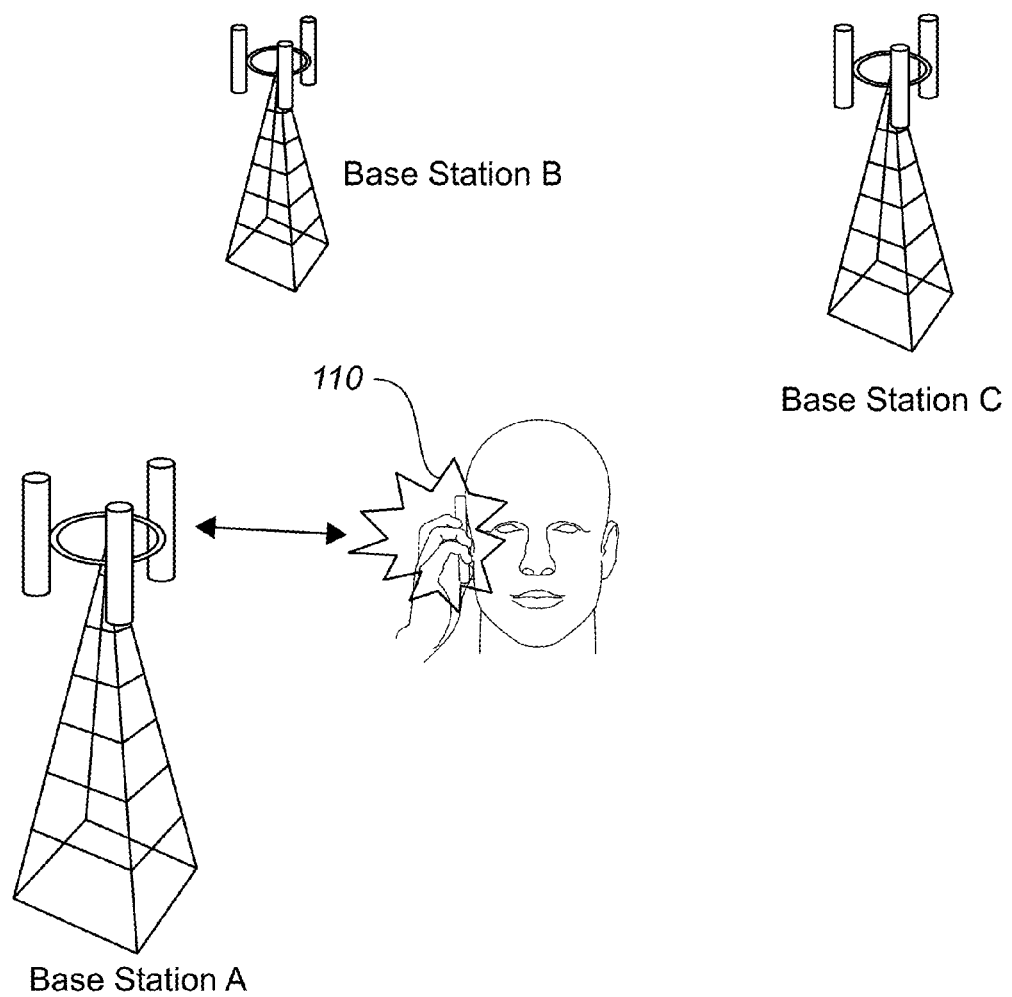
FIG. 11 illustrates an example where several Base Stations, designated A, B and C are potentially within range of a Mobile Station. The mode selected initially provides only a marginal link with Base Station A.

FIG. 11 illustrates an example where several Base Stations, designated A, B and C are potentially within range of the Mobile Station 110. The initially selected mode provides only a marginal link with Base Station A.

Figure 12:
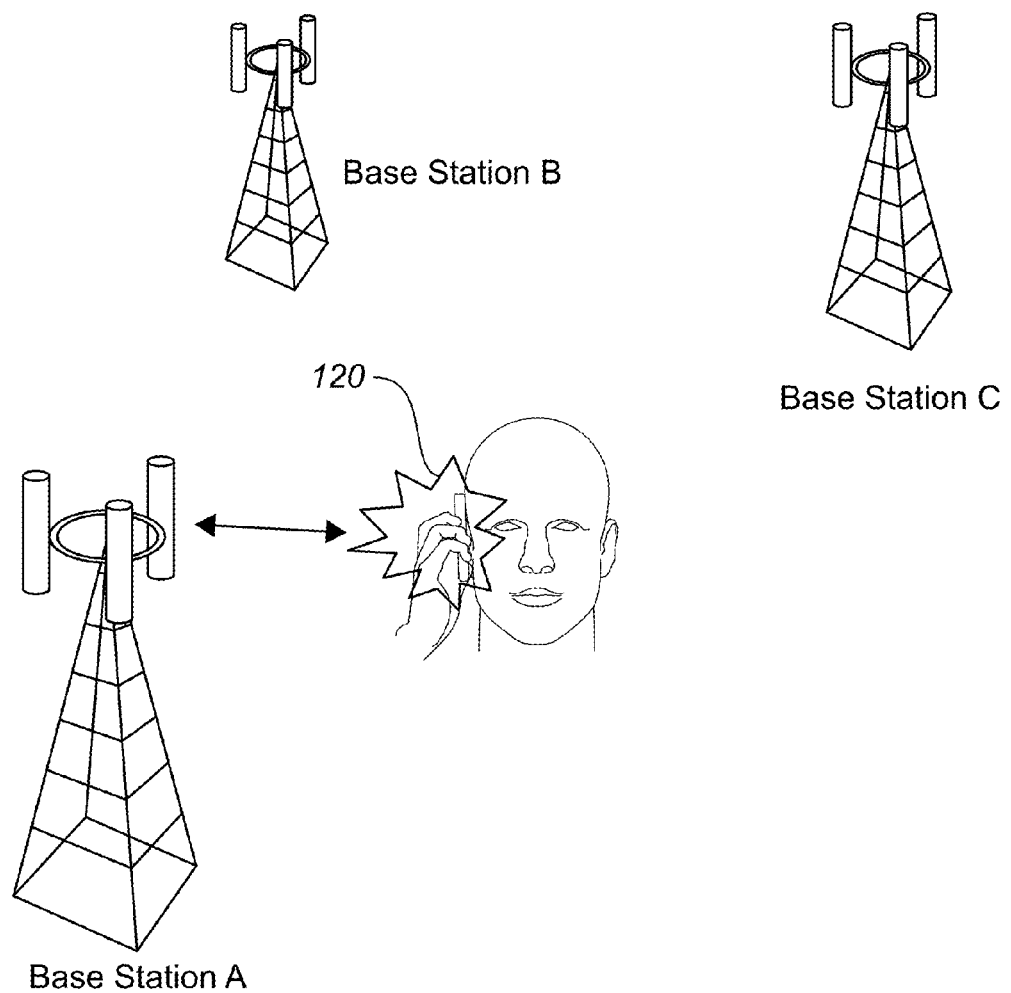
FIG. 12 illustrates an example where several Base Stations, designated A, B and C are potentially within range of the Mobile Station. The selection of a different mode now provides a 15 dB improved link with Base Station A.

FIG. 12 illustrates an example where several Base Stations, designated A, B and C are potentially within range of the Mobile Station 120. The selection of a different mode now provides a 15 dB improved link with Base Station A.

Figure 13:
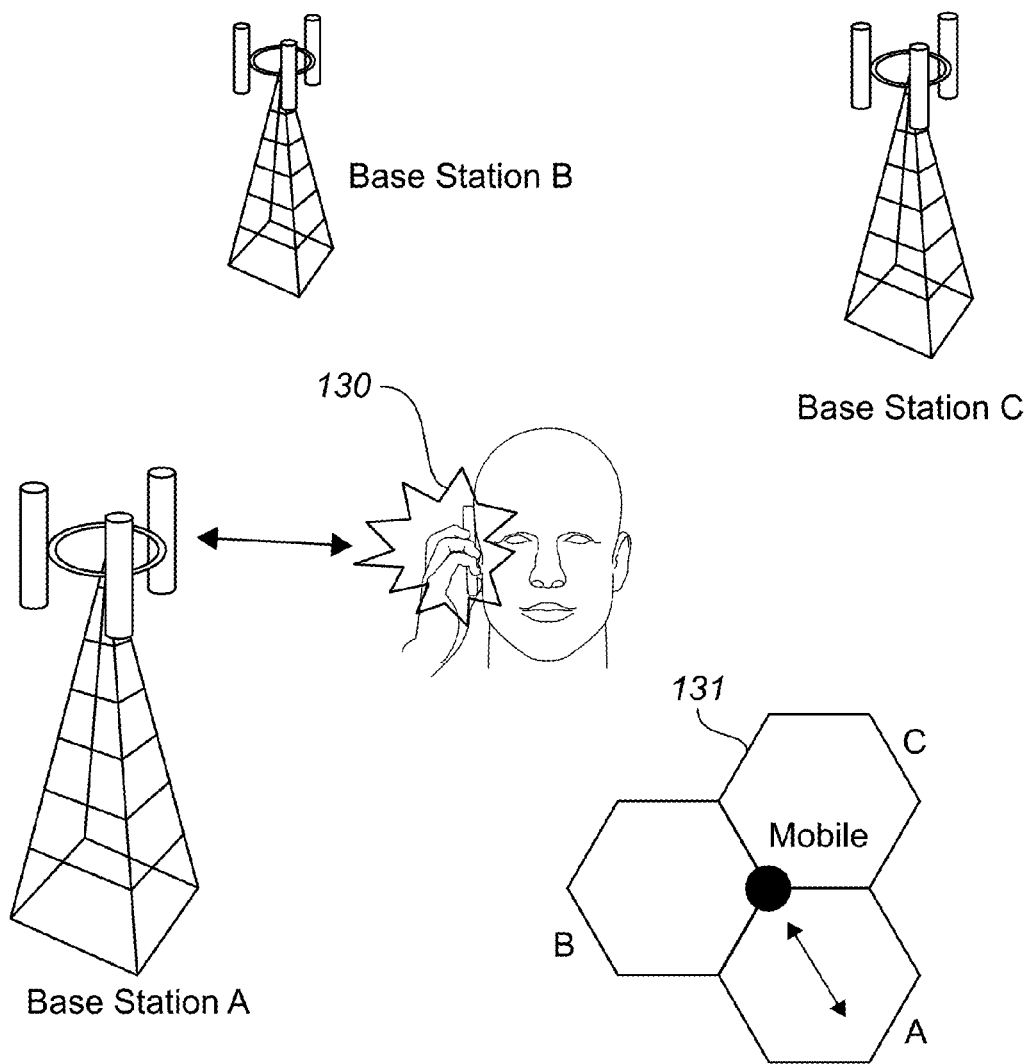
FIG. 13 illustrates an example where several Base Stations, designated A, B and C are potentially within range of the Mobile Station. The diagram shows that in some cases depending on the orientation and propagation between Mobile Station and Base Stations A, B, C, switching to a better Base Station will optimize the Quality of Service.

FIG. 13 illustrates an example where several Base Stations, designated A, B and C are potentially within range of the Mobile Station 130. The diagram 131 shows that in some cases depending on the orientation and propagation between Mobile Station 131 and Base Stations A, B, C, switching to a better Base Station will optimize the Quality of Service.

Figure 14:
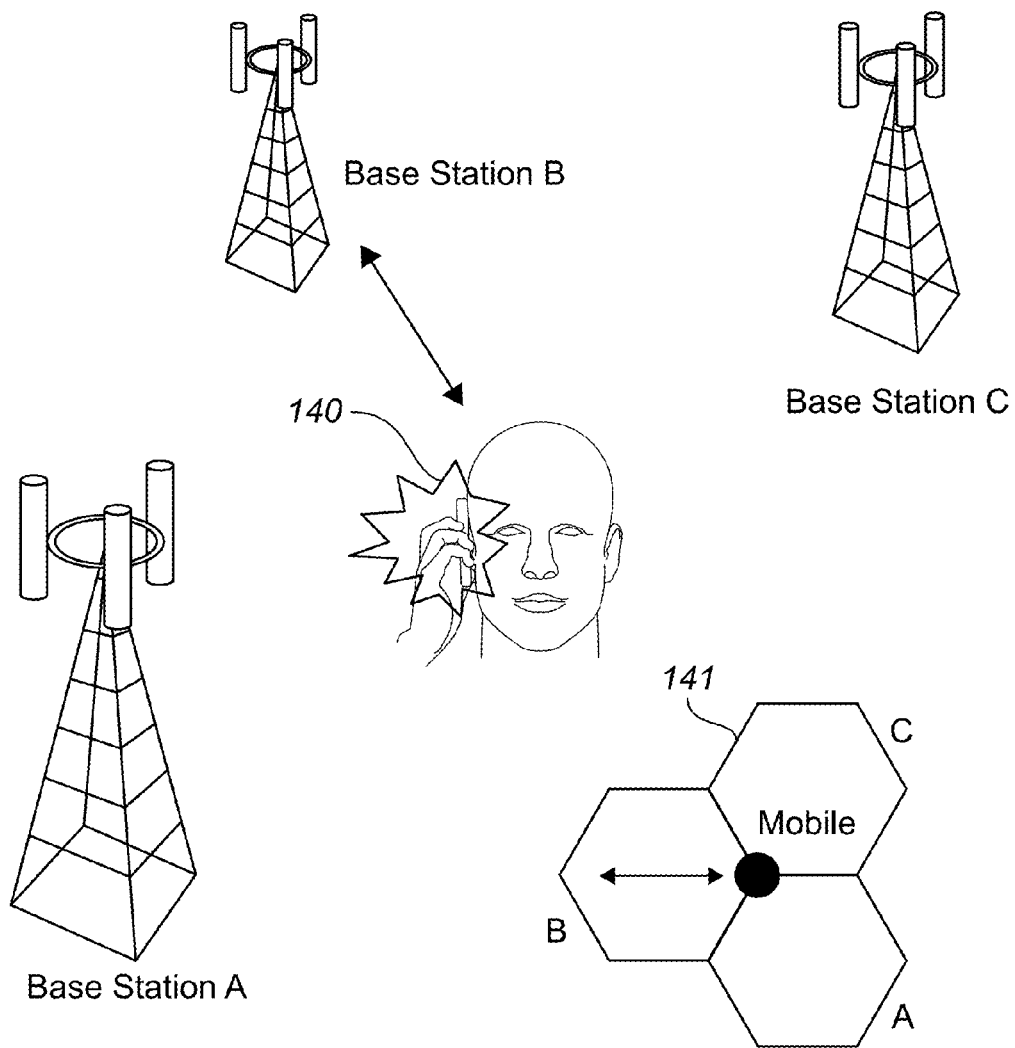
FIG. 14 illustrates an example where several Base Stations, designated A, B and C are potentially within range of the Mobile Station. The diagram shows that in some cases depending on the orientation and propagation between Mobile Station and Base Stations A, B, C, switching to a better Base Station will optimize the Quality of Service. In this instance, switching to Base Station B improves and improved link.

FIG. 14 illustrates an example where several Base Stations, designated A, B and C are potentially within range of the Mobile Station 140. The diagram 141 shows that in some cases depending on the orientation and propagation between Mobile Station 140 and Base Stations A, B, C, switching to a better Base Station will optimize the Quality of Service. In this instance, switching to Base Station B improves and improved link.

Figure 15:
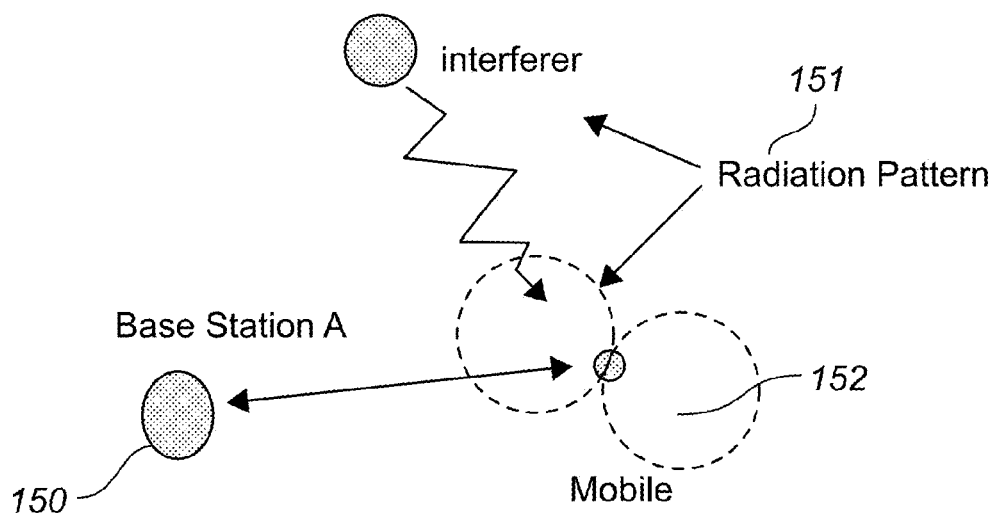
FIG. 15 illustrates an example of the antenna radiation pattern of the mobile station prior to adjustment for optimal link quality. The intended signal from Base Station A and an interferer are received by the antenna in the mobile station.

FIG. 15 illustrates an example of the antenna radiation pattern of the mobile station 152 prior to adjustment for optimal link quality. The intended signal from Base Station A 150 and an interferer 151 are received by the antenna in the mobile station.

Figure 16:
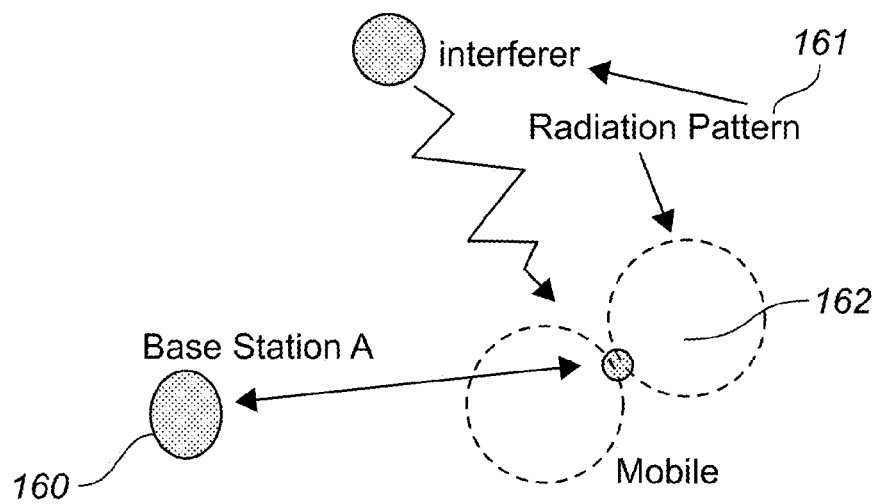
FIG. 16 illustrates an example of the antenna radiation pattern of the mobile station after adjustment for optimal link quality between the mobile station and Base Station A. The interferer signal has reduced reception to the mobile station due to the radiation pattern being adjusted to null out interferer.

FIG. 16 illustrates an example of the antenna radiation pattern of the mobile station 162 after adjustment for optimal link quality between the mobile station and Base Station A 160. The interferer signal 161 has reduced reception to the mobile station due to the radiation pattern being adjusted to null out interferer.

Figure 17:
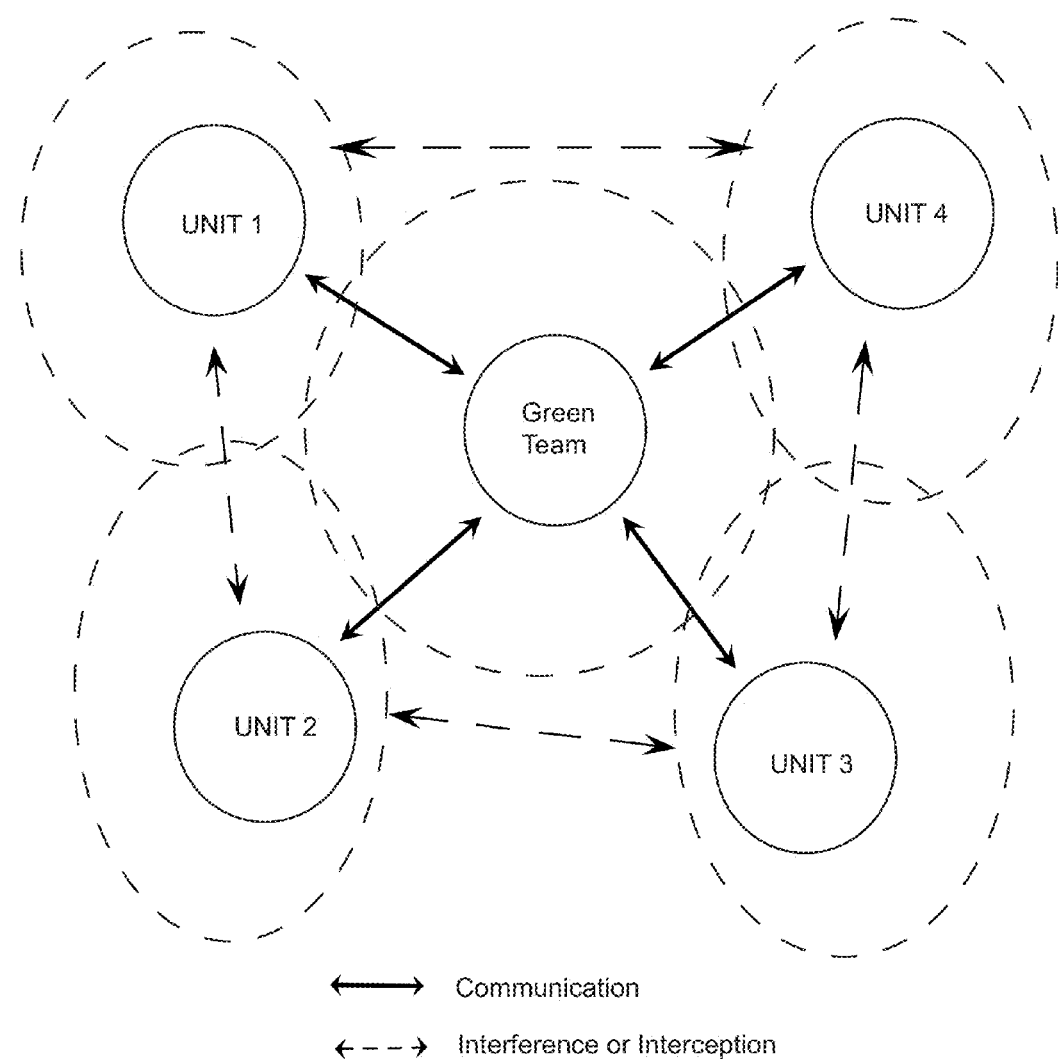
FIG. 17 illustrates an example of mobile stations 1 through 4 with omni-directional antennas, or antennas that do not have dynamic radiation pattern control. Communication is achieved between intended pairs of mobile stations but interference is generated between unintended users.

FIG. 17 illustrates an example of mobile stations 1 through 4 with omni-directional antennas, or antennas that do not have dynamic radiation pattern control. Communication is achieved between intended pairs of mobile stations but interference is generated between unintended users.

Figure 18:
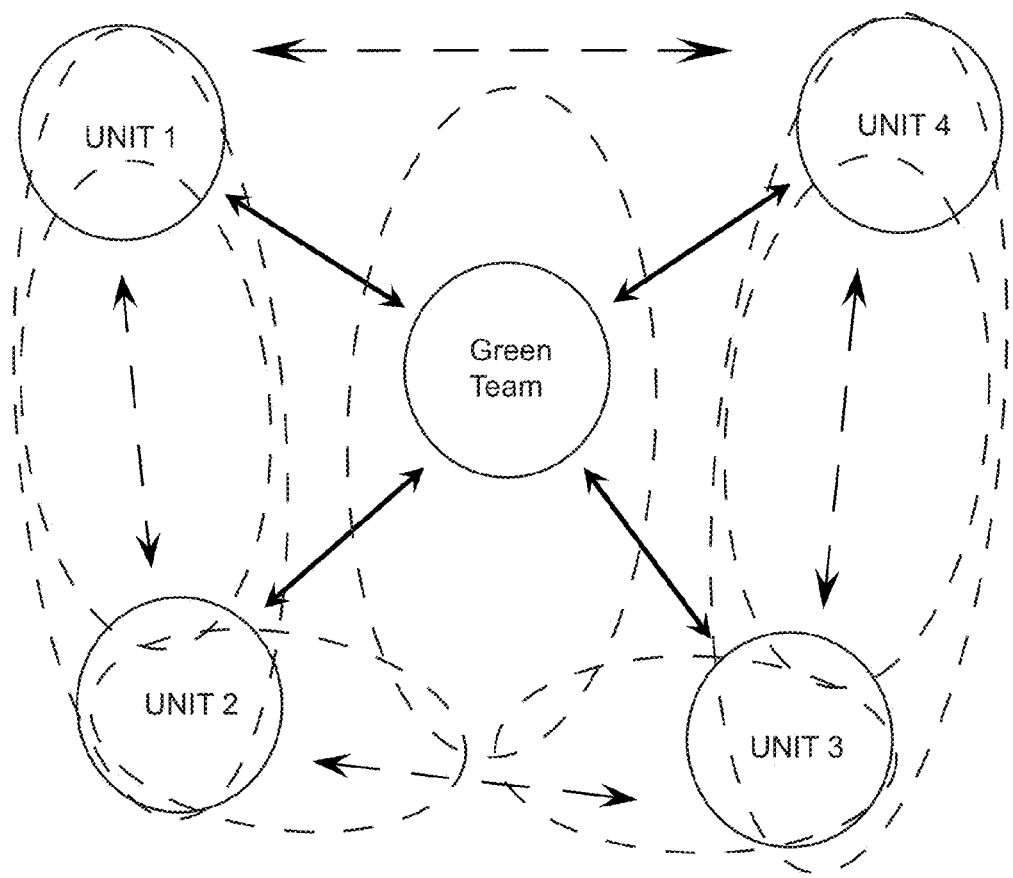
FIG. 18 illustrates an example of mobile stations 1 through 4 with adaptive antenna systems. Interference has been greatly reduced due to dynamic adjust of antenna radiation patterns, minimizing interference between users.

FIG. 18 illustrates an example of mobile stations 1 through 4 with adaptive antenna systems. Interference has been greatly reduced due to dynamic adjust of antenna radiation patterns, minimizing interference between users.

The invention claimed is:

1. An adaptive antenna system, comprising:
    a first isolated magnetic dipole (IMD) element;
    a first parasitic element;
    a first active tuning element coupled with said first parasitic element; and
    an antenna tuning module adapted to provide control signals to said active tuning element for altering a radiating mode of the first IMD element;
    wherein the antenna tuning module further comprises a processor adapted to monitor communication system performance and determine when the radiating mode is to be altered.

2. The antenna system of claim 1, wherein a system metric is sampled from a signal source and a first interferer; and the antenna tuning module is adapted to alter the radiating mode to reduce the signal level of the interferer.

3. The antenna system of claim 2, wherein said system metric is a receive signal strength indicator.

4. The antenna system of claim 1, wherein the adaptive antenna system comprises two or more parasitic elements coupled with active tuning elements, and the parasitic elements are adjusted to form two or more null positions for minimizing the interference from two or more spatially separate interfering sources.

5. The antenna system of claim 1, comprising a second isolated magnetic dipole (IMD) antenna element, wherein the first and second IMD antenna elements are connected to a transceiver and the parasitic element is adjusted to alter the performance from the first and second IMD antennas to equalize the channels.

6. The antenna system of claim 5, wherein the two antenna elements are combined to form a two element array, and the parasitic element is adjusted to minimize interference from an unwanted source.

7. An adaptive antenna system implemented within a host device, the adaptive antenna system comprising:
    a first antenna radiating element;
    a first parasitic element;
    a first active tuning element associated with said first parasitic element;
    an antenna tuning module adapted to provide control signals to the first active tuning element for altering a radiation pattern mode of the first antenna radiating element; and
    a processor associated with the host device and adapted to monitor communication system performance for determining when the radiation pattern mode is to be altered;
    wherein a system metric is sampled from a signal source and a first interferer, and wherein the radiation pattern mode is altered to reduce the signal level of the interferer.

8. The antenna system of claim 7, wherein the processor is further adapted to supply a command to the antenna tuning module, and the antenna tuning module is adapted to supply control signaling to the first active tuning element and associated first parasitic element for altering the radiation pattern mode.

9. The antenna system of claim 7, comprising two or more parasitic elements, each of said parasitic elements coupled with at least one active tuning element; wherein the parasitic elements are adapted to form two or more null positions for minimizing the interference from two or more spatially separate interfering sources.

10. The adaptive antenna system of claim 7, wherein the antenna radiating element is one of: an Isolated Magnetic Dipole (IMD) element, a monopole, dipole, planar inverted F-type antenna (PIFA), inverted F-type antenna (IFA), microstrip patch, or a loop.

* * * * *